Sept. 16, 1958 W. M. JENNINGS 2,851,801

IDENTIFICATION MEANS FOR ROLLS OF FILM OR TAPE

Filed Oct. 18, 1954

INVENTOR.
WANDA M. JENNINGS
BY

J. B. Dickman Jr.
ATTORNEY

United States Patent Office 2,851,801

Patented Sept. 16, 1958

2,851,801

IDENTIFICATION MEANS FOR ROLLS OF FILM OR TAPE

Wanda M. Jennings, North Hollywood, Calif.

Application October 18, 1954, Serial No. 462,792

1 Claim. (Cl. 40—8)

Figures 1, 2, 3, 4, 5:
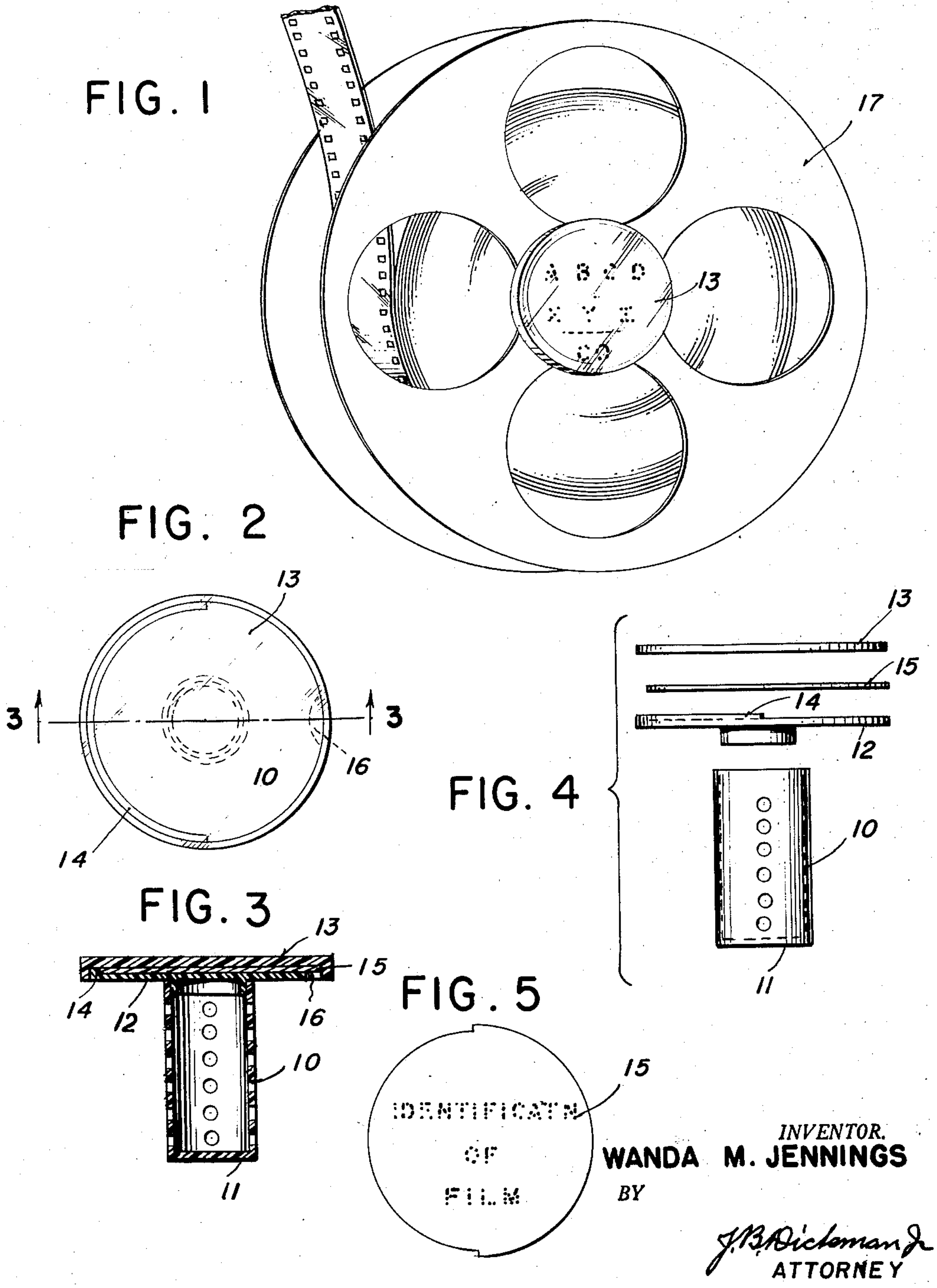

This invention relates to identifying devices for use in connection with reels of films or tape for purposes of quick identification of the contents of the reel.

The identifying device is a core and disk combination designed for instant identification of small rolls of positive or negative film, tape or the like. It is a simple and convenient item that may be advantageously used especially in the course of editing films or tape to prepare a finished composite roll from a multiplicity of small "takes" which may contain a lot of superfluous or imperfect parts that have to be cut or touched up and fitted into the finished composite. It has been customary to mark up the roll on which the film or tape was wound to indicate what the roll consisted of. This is a very inconvenient way of identifying the material because of the limited means at hand and space available for making such identifying inscriptions on the roll. The identifying device is a simple inexpensive item that may be mass-produced and used as needed to identify new strips as they are made or upon later sorting of a number of rolls for future identification as well as for labelling finished composites. A number of rolls of film or tape may be stored in a single storage container and a list of the rolls be placed on the container, but the individual rolls with their identifying devices could be quickly identified and selected as needed.

The main object of the present invention is to provide a simple and convenient means of labelling rolls of film for purposes of identification.

Other and more specific objects will become apparent in the following detailed description of a preferred form of the invention, having reference to the accompanying drawing, wherein:

Fig. 1 is a perspective view of the identifying device in place on a roll or reel of film, Fig. 2 is a plan view of the device per se, Fig. 3 is a sectional view thereof taken on the line 3—3 of Fig. 2, Fig. 4 is an exploded view of the several parts in their relative order as they appear in the assembled view in Fig. 3, and Fig. 5 is a plan view of a disc insert that may be used for placing the identifying information on it before inserting it in the assembly.

The identifying device may be formed of light plastic non-combustible material and the parts may be mass-produced by molding or in any other suitable manner.

The assembly comprises a cylindrical core member 10 closed at the bottom end 11, and perforated to permit passage of fumes etc. when required, such as when some film conditioners or preservatives are used; a disc 12 sealed to the open top of the cylindrical core member, and a transparent cover 13 that fits over said disc. The disc 12 has a raised peripheral edge 14 around half of its top side remote from the cylindrical core, the other half being open. A cover disc 13 of the same circumference as the disc 12 is glued, cemented, or affixed in some other manner to the edge 14, and overlies the open half of the disc 12. A recess is formed, within which an indicia bearing member 15 is placed. This member 15 may be made of non-combustible sheet material, or other suitable substance. The half of the disc 12 which is bounded by the raised edge 14 is of lesser diameter than the open half and the insert 15 is formed to exactly fit the half of lesser diameter and the open half of greater diameter. In assembled position, the cover disc, the indicia bearing member and the other disc are all in alignment. A thumb notch 16 may be cut out of the edge of disc 12 opposite the raised edge 14 to facilitate removal of member 15 when desired, especially in the form shown in the exploded view (Fig. 4) where the cover 13 does not have a flange to fit snugly over the disc as in the form shown in Figs. 2 and 3.

Fig. 1 shows the identifying device in place on a roll of film 17. The core of the device may be filled with a conditioner or preservative for the film in storage.

Many obvious modifications in material and construction may be made without departing from the spirit and scope of this invention, which is defined in the appended claim.

What is claimed is:

A film identifying device comprising a cylindrical core adapted to be placed in the center of a roll of film, a disc fixed to one end of said core, said disc having a raised peripheral edge around half of its side remote from said core, a flat cover disc affixed to said raised peripheral edge on said first disc, and overlying the other open half of said first disc to form a recess for an indicia bearing member between said first disc and said cover disc, said recess having its half bounded by the raised peripheral edge, of smaller diameter than the open half, and an indicia bearing member having one half its area of a diameter to fit the half of the recess bounded by the raised peripheral edge, and its other half of a diameter to fit the open half of said recess, the outer edges of the first disc, the indicia bearing member and the cover disc being in alignment when in assembled position.

References Cited in the file of this patent

UNITED STATES PATENTS

| | | |
|---|---|---|
| 1,069,728 | Russell | Aug. 12, 1913 |
| 1,484,234 | Prentiss | Feb. 19, 1924 |
| 1,840,822 | Ross | Jan. 12, 1932 |
| 1,853,902 | Kaplan | Apr. 12, 1932 |
| 1,872,159 | McCreary | Aug. 16, 1932 |
| 1,918,243 | Bergaud | July 18, 1933 |
| 2,080,066 | Sheppard | May 11, 1937 |
| 2,214,030 | Pereles | Sept. 10, 1940 |

FOREIGN PATENTS

| | | |
|---|---|---|
| 181,632 | Germany | Feb. 22, 1907 |